(12) United States Patent
Tominaga

(10) Patent No.: US 8,692,913 B2
(45) Date of Patent: Apr. 8, 2014

(54) SOLID-STATE ELECTRONIC IMAGE SENSING APPARATUS AND METHOD OF CONTROLLING OPERATION OF SAME

(75) Inventor: Kenichiro Tominaga, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 625 days.

(21) Appl. No.: 13/016,449

(22) Filed: Jan. 28, 2011

(65) Prior Publication Data

US 2011/0228114 A1   Sep. 22, 2011

(30) Foreign Application Priority Data

Mar. 16, 2010 (JP) ................................ 2010-059339

(51) Int. Cl.
*H04N 5/228* (2006.01)

(52) U.S. Cl.
USPC ........................................ 348/280; 348/208.6

(58) Field of Classification Search
USPC ........... 348/220.1, 230.1, 267, 268, 272–282, 348/294, 301–308, 317, 342, 348/208.1–208.16; 257/432, 435, 291
See application file for complete search history.

(56) References Cited

U.S. PATENT DOCUMENTS

| | | | | |
|---|---|---|---|---|
| 5,805,217 A * | 9/1998 | Lu et al. | | 348/273 |
| 6,249,643 B1 * | 6/2001 | Mimura | | 386/224 |
| 6,522,356 B1 * | 2/2003 | Watanabe | | 348/272 |
| 6,882,364 B1 * | 4/2005 | Inuiya et al. | | 348/252 |
| 7,532,236 B2 | 5/2009 | Yamamoto et al. | | |
| 7,834,927 B2 * | 11/2010 | Glenn | | 348/340 |
| 7,839,437 B2 * | 11/2010 | Kasai et al. | | 348/238 |
| 8,035,711 B2 * | 10/2011 | Liu et al. | | 348/277 |
| 8,169,521 B2 * | 5/2012 | Lee | | 348/305 |
| 2004/0046881 A1 * | 3/2004 | Utagawa | | 348/294 |
| 2005/0185079 A1 * | 8/2005 | Zarnowski et al. | | 348/308 |
| 2006/0202107 A1 * | 9/2006 | Zarnowski et al. | | 250/208.1 |
| 2007/0040100 A1 * | 2/2007 | Zarnowski et al. | | 250/208.1 |
| 2008/0128598 A1 * | 6/2008 | Kanai et al. | | 250/226 |
| 2011/0228114 A1 * | 9/2011 | Tominaga | | 348/208.6 |

FOREIGN PATENT DOCUMENTS

| | | |
|---|---|---|
| JP | 2001-358999 A | 12/2001 |
| JP | 2006-54788 A | 2/2006 |

* cited by examiner

*Primary Examiner* — Aung S Moe
(74) *Attorney, Agent, or Firm* — Birch, Stewart, Kolasch & Birch, LLP

(57) ABSTRACT

Signal charge that has accumulated in photodiodes of odd-numbered rows is read out one row at a time in turn in the column direction and represents an odd-numbered-row image. Signal charge that has accumulated in photodiodes of even-numbered rows is read out one column at a time in turn in the row direction and represents an even-numbered-row image. The even-numbered-row image is selected if a subject moves in the horizontal direction, and the odd-numbered-row image is selected if the subject moves in the vertical direction. An image in which rolling shutter distortion has been reduced is thus obtained.

7 Claims, 10 Drawing Sheets

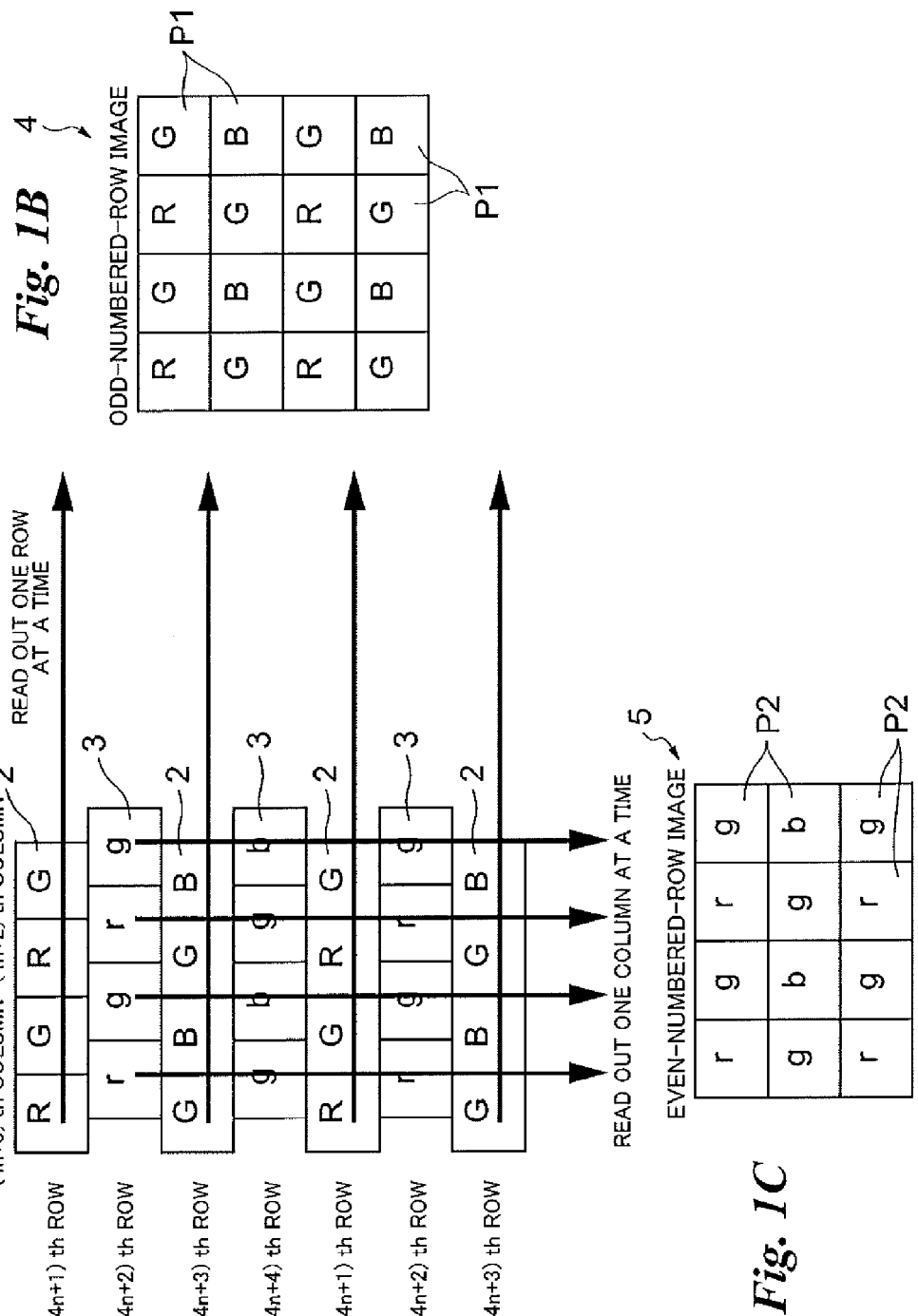
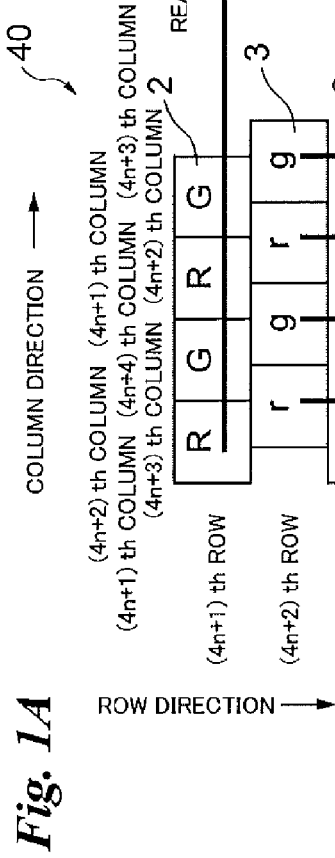
Fig. 1A
Fig. 1B
Fig. 1C

SOLID-STATE ELECTRONIC IMAGE SENSING APPARATUS AND METHOD OF CONTROLLING OPERATION OF SAME

BACKGROUND OF THE INVENTION

1. Field of the Invention

This invention relates to a solid-state electronic image sensing apparatus and to a method of controlling the operation of this apparatus.

2. Description of the Related Art

In a CMOS sensor, signal charge that has accumulated in photodiodes is read out in turn one row at a time and, as a consequence, exposure timing differs row by row. When a moving subject is imaged, therefore, distortion can occur (this is so-called "rolling shutter distortion"). Reducing such rolling shutter distortion has been considered (see the specification of Japanese Patent Application Laid-Open No. 2006-54788). By the time the image is obtained, however, a time lag occurs. Further, since rolling shutter distortion is produced also by camera shake, it has been proposed to reduce rolling shutter distortion by performing motion detection with respect to camera shake (see the specification of Japanese Patent Application Laid-Open No. 2001-358999). Control, however, is complicated.

SUMMARY OF THE INVENTION

An object of the present invention is to reduce rolling shutter distortion in comparatively simple fashion.

According the present invention, the foregoing object is attained by providing a solid-state electronic image sensing apparatus comprising: a MOS sensor (For example, a MOS sensor is a C-MOS sensor.) having optoelectronic transducers in each of which a color filter having a characteristic for transmitting a light component of the color red, green or blue or of the color cyan, magenta or yellow is formed on a photoreceptor surface, the optoelectronic transducers being arrayed in odd-numbered rows and odd-numbered columns and in even-numbered columns and even-numbered rows, or in odd-numbered rows and even-numbered columns and even-numbered rows and odd-numbered columns, wherein characteristics of color filters that have been formed in two optoelectronic transducers in a diagonal direction in a [4n (where n is an integer equal to or greater than zero)+1]th row and (4n+2)th row are the same and characteristics of color filters that have been formed in two optoelectronic transducers in a diagonal direction in a (4n+3)th row and (4n+4)th row are the same; and a read-out control device (read-out control means) for controlling the MOS sensor so as to read out and output, as a first video signal, signal charge, which has accumulated in optoelectronic transducers of odd-numbered rows, one row at a time or one column at a time in turn, and read out and output, as a second video signal, signal charge, which has accumulated in optoelectronic transducers of even-numbered rows, one column at a time or one row at a time in turn so as to differ from read-out of the signal charge that has accumulated in the optoelectronic transducers of the odd-numbered rows.

The present invention also provides an operation control method suited to the solid-state electronic image sensing apparatus described above. Specifically, the present invention provides a method of controlling operation of a solid-state electronic image sensing apparatus in which, in a MOS sensor having optoelectronic transducers in each of which a color filter having a characteristic for transmitting a light component of the color red, green or blue or of the color cyan, magenta or yellow is formed on a photoreceptor surface, the optoelectronic transducers being arrayed in odd-numbered rows and odd-numbered columns and in even-numbered columns and even-numbered rows, or in odd-numbered rows and even-numbered columns and even-numbered rows and odd-numbered columns, the characteristics of color filters that have been formed in two optoelectronic transducers in a diagonal direction in a [4n (where n is an integer equal to or greater than zero)+1]th row and (4n+2)th row are the same and the characteristics of color filters that have been formed in two optoelectronic transducers in a diagonal direction in a (4n+3)th row and (4n+4)th row are the same; the method comprising a step of controlling the MOS sensor so as to read out and output, as a first video signal, signal charge, which has accumulated in optoelectronic transducers of odd-numbered rows, one row at a time or one column at a time in turn, and read out and output, as a second video signal, signal charge, which has accumulated in optoelectronic transducers of even-numbered rows, one column at a time or one row at a time in turn so as to differ from read-out of the signal charge that has accumulated in the optoelectronic transducers of the odd-numbered rows.

In accordance with the present invention, a first video signal is based upon signal charge that has been read out one row at a time or one column at a time in turn. In a case where the first video signal or a second video that is output from a MOS sensor is based upon signal charge that has been read out one row at a time in turn, a difference in exposure starting time along the vertical direction is comparatively large. In a case where a subject exhibiting motion in the horizontal direction is imaged, therefore, rolling shutter distortion occurs. Conversely, in a case where the first video signal or second video that is output from the MOS sensor is based upon signal charge that has been read out one column at a time in turn, a difference in exposure starting time along the horizontal direction is comparatively large. In a case where a subject exhibiting motion in the vertical direction is imaged, therefore, rolling shutter distortion occurs. A subject image of reduced rolling shutter distortion is obtained by using a video signal based upon signal charge that has been read out one row at a time in turn in a case where a subject exhibiting motion in the vertical direction is imaged, and using a video signal based upon signal charge that has been read out one column at a time in turn in a case where a subject exhibiting motion in the horizontal direction is imaged.

The apparatus may further comprise: a motion-direction detecting device (motion direction detecting means) for detecting whether direction of motion of a subject imaged by the MOS sensor is the horizontal direction or the vertical direction; and a first selecting device (first selecting means) for selecting, in response to detection of motion in the horizontal direction by the motion-direction detecting device, a video signal, which is either the first video signal or the second video signal, obtained based upon the signal charge that has been read out one column at a time in turn, and selecting, in response to detection of motion in the vertical direction by the motion-direction detecting device, a video signal, which is either the first video signal or the second video signal, obtained based upon the signal charge that has been read out one row at a time in turn.

The apparatus may further comprise: a motion-amount detecting device (motion-amount detecting means) for detecting amount of motion in the direction of motion detected by the motion detecting device; and a first resizing device (first resizing means) for resizing a subject image, which is represented by the video signal selected by the first selecting device, at a resizing ratio conforming to the amount of motion detected by the motion-amount detecting device and the direction of motion detected by the motion-direction detecting device.

Further, the apparatus may further comprise a shake-direction detecting device (shake detecting means) for detecting whether direction of shake of the solid-state electronic image sensing apparatus is the horizontal direction or the vertical direction; and a second selecting device (second selecting means) for selecting, in response to detection of shake in the horizontal direction by the shake-direction detecting device, a video signal, which is either the first video signal or the second video signal, obtained based upon the signal charge that has been read out one column at a time in turn, and selecting, in response to detection of shake in the vertical direction by the shake-direction detecting device, a video signal, which is the first video signal or the second video signal, obtained based upon the signal charge that has been read out one row at a time in turn.

The apparatus may further comprise: a shake-amount detecting device (shake-amount detecting means) for detecting amount of shake in the direction of shake detected by the shake-direction detecting device; and a second resizing device (second resizing means) for resizing a subject image, which is represented by the video signal selected by the second selecting device, at a resizing ratio conforming to the amount of shake detected by the shake-amount detecting device and the direction of shake detected by the shake-direction detecting device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1A is a schematic view of a C-MOS, FIG. 1B an odd-numbered-row image and FIG. 1C an even-numbered-row image.

DESCRIPTION OF THE PREFERRED EMBODIMENTS

Figure 2:
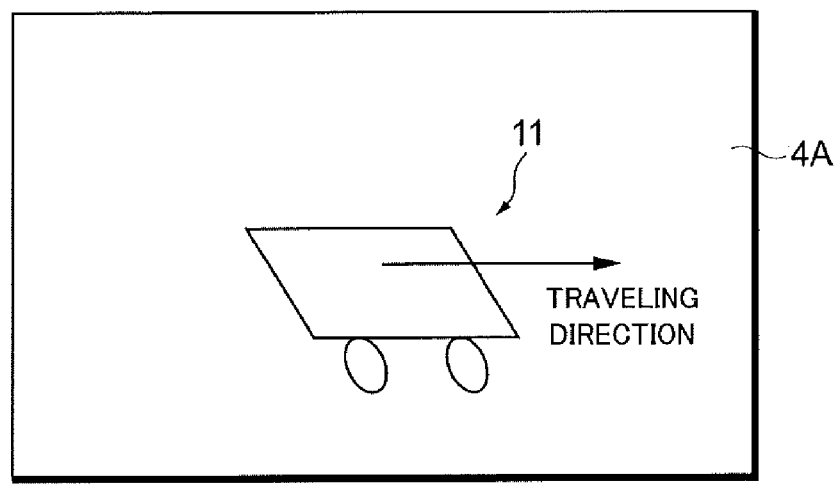
FIG. 2 is an example of an odd-numbered-row image.

Preferred embodiments of the present invention will now be described in detail with reference to the drawings.

FIG. 1A is a schematic view illustrating a portion of a C-MOS (Complementary Metal Oxide Semiconductor) sensor 40 (A MOS sensor other than a C-MOS sensor can be utilized.) according to a preferred embodiment of the present invention.

The C-MOS sensor 40 has a number of photodiodes 2 and 3 arrayed in the row and column directions. Numeral "2" is attached to the photodiodes arrayed in odd-numbered rows, and numeral "3" is attached to the photodiodes arrayed in even-numbered rows. In this embodiment, the photodiodes 2 or 3 are arrayed in odd-numbered rows and odd-numbered columns and in even-numbered columns and even-numbered rows. However, it may be so arranged that the photodiodes 2 or 3 are arrayed in odd-numbered rows and even-numbered columns and in even-numbered rows and odd-numbered columns.

A color filter having a characteristic for transmitting a light component of the color red, green or blue is formed on a photoreceptor surface of each of the photodiodes 2 or 3. The character "R" or "r" is attached to a filter that passes the red color component, the character "G" or "g" is attached to a filter that passes the green color component, and character "B" or "b" is attached to a filter that passes the blue color component. The characteristics of color filters that have been formed in two photodiodes 2 and 3 in a diagonal direction in a [4n (where n is an integer equal to or greater than zero)+1]th row and (4n+2)th row are the same and the characteristics of color filters that have been formed in two photodiodes 2 and 3 in a diagonal direction in a (4n+3)th row and (4n+4)th row are the same. Instead of a color filter having a characteristic for transmitting a light component of the color red, green or blue, a color filter having a characteristic for transmitting a light component of the color cyan, magenta or yellow may be provided. In this case also the characteristics of color filters that have been formed in two optoelectronic transducers (photodiodes) in a diagonal direction are the same, as mentioned above.

In this embodiment, signal charge that has accumulated in the photodiodes 2 of the odd-numbered rows is read out one row at a time in turn in the column direction. The image of a subject (which will be referred to as an "odd-numbered-row image") is obtained based upon the signal charge that has accumulated in the photodiodes 2 of the odd-numbered rows.

FIG. 1B illustrates a portion of an odd-numbered-row image 4. Pixels P1 constituting the odd-numbered-row image 4 correspond to the photodiodes 2 of the odd-numbered rows of C-MOS sensor 40. In order to facilitate an understanding of the relationship between the color filters formed on the photodiodes 2 and the pixels P1 of the odd-numbered rows, the pixels P1 are also assigned the characters of the color filters that have been formed in the corresponding photodiodes 2.

Since the signal charge that has been stored in the photodiodes 2 of the odd-numbered rows is read out one row at a time in turn in the column direction to obtain the odd-numbered-row image 4, the lower the row of the photodiodes 2 in which signal charge has accumulated, the later the read-out timing of this signal charge in comparison with the signal charge that has accumulated the photodiodes 2 of the upper rows. However, the read-out timing of the signal charge that has accumulated in the photodiodes 2 in the columns on the right side is approximately the same as that of the signal charge that has accumulated in the photodiodes 2 in the columns on the left side.

Further, in this embodiment, signal charge that has accumulated in the photodiodes 3 of the even-numbered rows is read out one column at a time in turn in the row direction. The image of a subject (which will be referred to as an "even-numbered-row image") is obtained based upon the signal charge that has accumulated in the photodiodes 3 of the even-numbered rows.

FIG. 1C illustrates a portion of an even-numbered-row image 5. Pixels P2 constituting the even-numbered-row image 5 correspond to the photodiodes 3 of the C-MOS sensor 40. In order to facilitate an understanding of the relationship between the color filters formed on the photodiodes 3 and the pixels P2 of the even-numbered rows, the pixels P2 are also assigned the characters of the color filters that have been formed in the corresponding photodiodes 3.

Since the signal charge that has been stored in the photodiodes 3 of the even-numbered rows is read out one column at a time in turn in the row direction to obtain the even-numbered-row image 5, the more rightward the column of the photodiodes 3 in which signal charge has accumulated, the later the read-out timing of this signal charge in comparison with the signal charge that has accumulated in the photodiodes 3 of the leftward rows. However, the read-out timing of the signal charge that has accumulated in the photodiodes 3 in the upper rows is approximately the same as that of the signal charge that has accumulated in the photodiodes 2 in the lower rows.

In a manner converse to that described above, signal charge that has accumulated in the photodiodes 2 of the odd-numbered rows may be read out one column at a time in turn in the column direction and signal charge that has accumulated in the photodiodes 3 of the even-numbered rows may be read out one row at a time in turn in the row direction.

FIG. 2 is an example of an odd-numbered-row image 4A.

The odd-numbered-row image 4A represents a subject moving in the horizontal direction. The odd-numbered-row image 4A contains a subject image 11 representing the subject moving in the horizontal direction. As mentioned above, since the odd-numbered-row image 4A is obtained by reading out signal charge, which has accumulated in the photodiodes 2, one row at a time in turn in the row direction, the read-out timing of the signal charge that has accumulated in the photodiodes 2 of lower rows is later than the read-out timing of the signal charge that has accumulated in the photodiodes 2 of the upper rows. As a consequence, the subject image 11 representing the subject moving in the horizontal direction develops rolling shutter distortion in the odd-numbered-row image 4A and is diagonally distorted.

Figure 3:
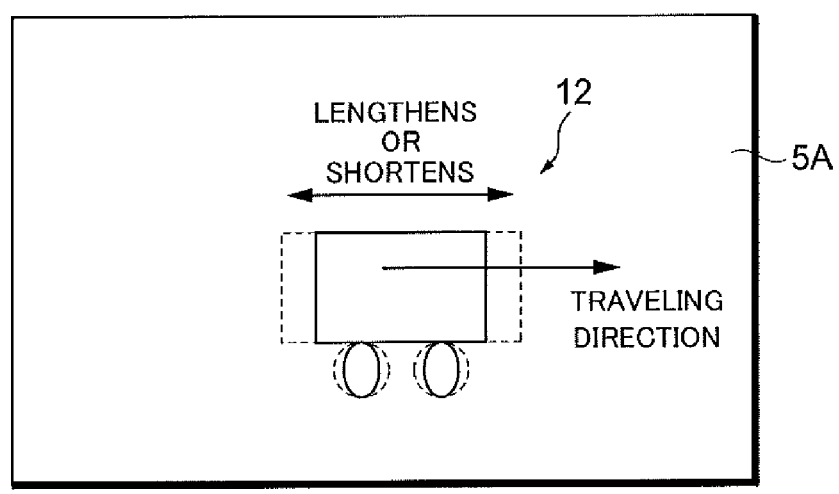
FIG. 3 is an example of an even-numbered-row image.

FIG. 3 is an example of an even-numbered-row image 5A.

The even-numbered-row image 5A represents a subject moving in the horizontal direction. The even-numbered-row image 5A contains a subject image 12 representing the subject moving in the horizontal direction. As mentioned above, since the even-numbered-row image 5A is obtained by reading out signal charge, which has accumulated in the photodiodes 3, one column at a time in turn in the column direction, the read-out timing of the signal charge that has accumulated in the photodiodes 2 of the upper rows is the same as the read-out timing of the signal charge that has accumulated in the photodiodes 2 of the lower rows. As a consequence, the subject image 12 representing the subject moving in the horizontal direction does not contain any diagonal distortion.

In the even-numbered-row image 5A, however, the read-out timing of the signal charge that has accumulated in the photodiodes 3 in the columns on the right side lags behind the read-out timing of the signal charge that has accumulated in the photodiodes 3 on the left side. Consequently, the subject image 12 representing the subject moving in the horizontal direction lengthens or shortens in accordance with the direction of travel. In this embodiment, the amount of lengthening or shortening is corrected in accordance with the direction of motion and the amount of motion.

Figure 4:
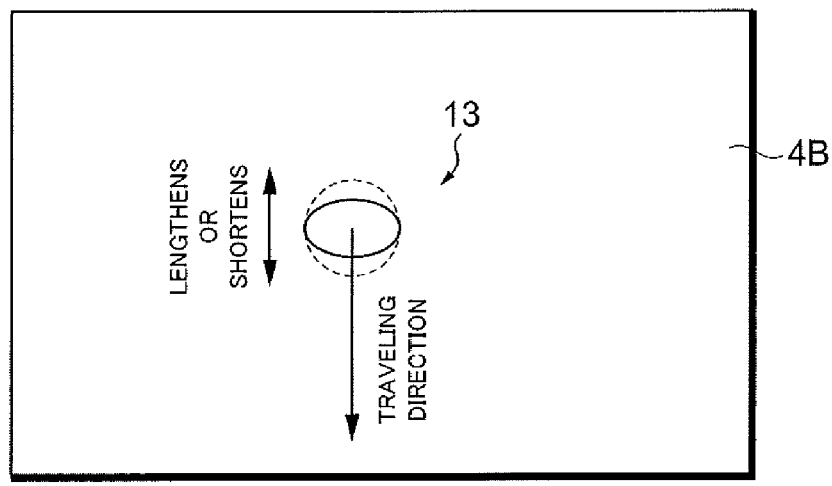
FIG. 4 is an example of an odd-numbered-row image.

FIG. 4 is another example of an odd-numbered-row image 4B.

The odd-numbered-row image 4B represents a subject moving in the vertical direction. The odd-numbered-row image 4B contains a subject image 13 representing the subject moving in the vertical direction. As mentioned above, since the odd-numbered-row image 4B is obtained by reading out signal charge, which has accumulated in the photodiodes 2, one row at a time in turn in the column direction, the read-out timing of the signal charge that has accumulated in the photodiodes 2 in the columns on right side is the same as the read-out timing of the signal charge that has accumulated in the photodiodes 2 in the columns on left side. As a consequence, the subject image 13 representing the subject moving in the vertical direction does not develop any distortion in the horizontal direction.

In the odd-numbered-row image 4B, however, the read-out timing of the signal charge that has accumulated in the photodiodes 2 of the lower rows lags behind the read-out timing of the signal charge that has accumulated in the photodiodes 2 of the upper rows. Consequently, the subject image 13 representing the subject moving in the vertical direction lengthens or shortens in accordance with the direction of travel (the vertical direction). The amount of lengthening or shortening is corrected in accordance with the direction of motion and the amount of motion.

Figure 5:
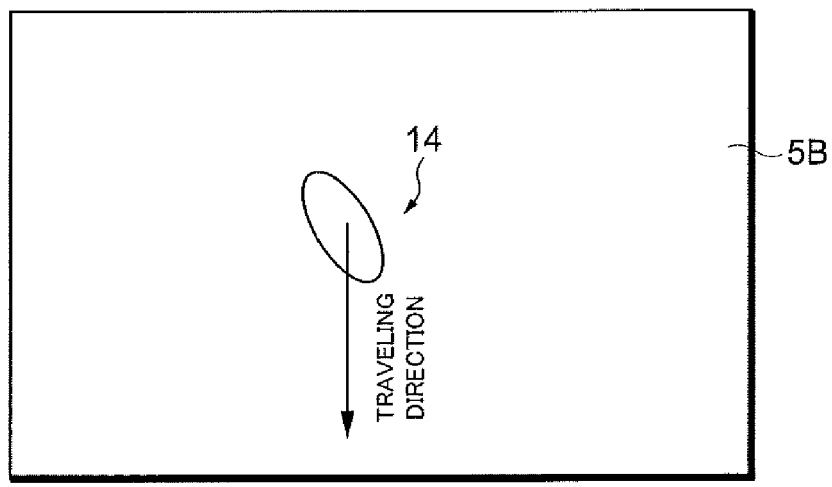
FIG. 5 is an example of an even-numbered-row image.

FIG. 5 is another example of an even-numbered-row image 5B.

The even-numbered-row image 5B also represents a subject moving in the vertical direction. The even-numbered-row image 5B contains a subject image 14 representing the subject moving in the vertical direction. As mentioned above, since the even-numbered-row image 5B is obtained by reading out signal charge, which has accumulated in the photodiodes 3, one column at a time in turn in the column direction, the subject image 14 representing the subject moving in the vertical direction develops diagonal distortion.

In this embodiment, the odd-numbered-row image is selected with regard to a subject moving in the horizontal direction, and the even-numbered-row image is selected with regard to a subject moving in the vertical direction. An image that is free of distortion in the diagonal direction is obtained.

Figure 6:
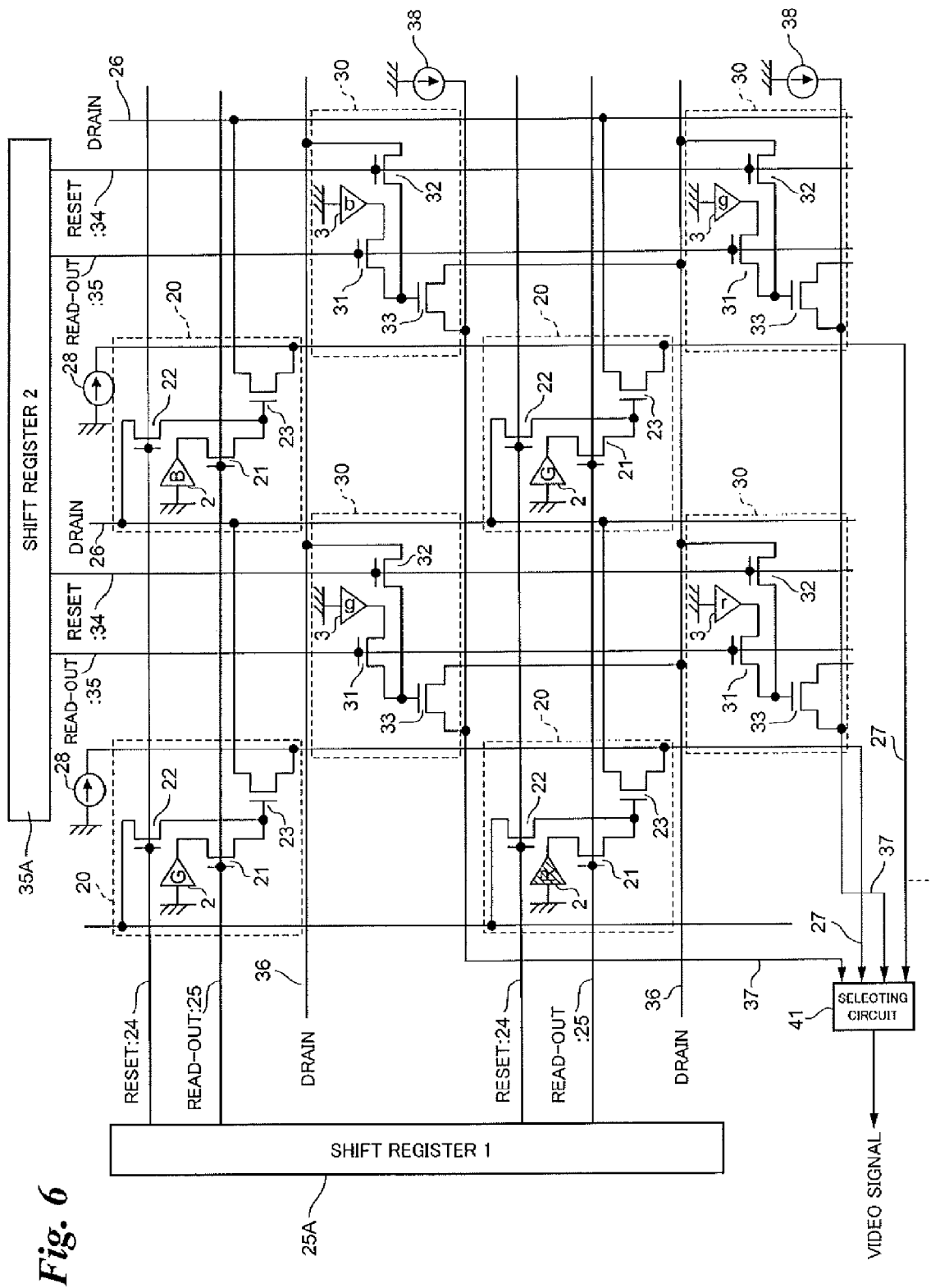
FIG. 6 is a circuit diagram of a C-MOS sensor.

FIG. 6 is a circuit diagram of the C-MOS sensor 40.

The source terminal of a first FET (Field-Effect Transistor) 21 is connected to each of the above-mentioned diodes 2 of the odd-numbered rows. A read-out line 25 is connected to the gate terminal of the first FET 21. The source terminal of a second FET 22 and the gate terminal of a third FET 23 are connected to the drain terminal of the first FET 21. A reset line 24 and a drain line 26 are connected to the gate terminal and source terminal, respectively, of the second FET 22. A signal line 27 and the drain line 26 are connected to the drain terminal and source terminal, respectively, of the third FET 23. The photodiode 2 and the first to third FETs 21 to 23 correspond to one pixel of the odd-numbered-row image. Let the set of the photodiode 2 and first to third FETs 21 to 23 be an odd-numbered-row pixel portion 20.

Similarly, the source terminal of a first FET 31 is connected to each of the above-mentioned diodes 3 of the even-numbered rows. A read-out line 35 is connected to the gate terminal of the first FET 31. The source terminal of a second FET 32 and the gate terminal of a third FET 33 are connected to the drain terminal of the first FET 31. A reset line 34 and a drain line 36 are connected to the gate terminal and source terminal, respectively, of the second FET 32. A signal line 37 and the drain line 36 are connected to the drain terminal and source terminal, respectively, of the third FET 33. The photodiode 3 and the first to third FETs 31 to 33 correspond to one pixel of the even-numbered-row image. Let the set of the photodiode 3 and first to third FETs 31 to 33 be an even-numbered-row pixel portion 30.

Constant-current sources 28 and 38 are connected to first ends of the signal lines 27 and 37.

A first shift register 25A, which controls the accumulation of electric charge in the photodiodes 2 of the odd-numbered rows and the discharge of this electric charge, has the reset line 24 and read-out line 25 connected thereto. The first shift register 25A outputs a reset pulse and a read-out pulse to the reset line 24 and read-out line 25, respectively, one row at a time in turn in the row direction, whereby needless charge that has accumulated in the photodiodes 2 of the odd-numbered rows is swept out from the drains. By outputting the read-out pulse from the first shift register 25A to the read-out line 25 one row at a time in the row direction, the signal charge that has accumulated in the photodiodes 2 of the odd-numbered rows is output from the signal lines 27 as a first video signal representing the odd-numbered-row image.

A second shift register 35A, which controls the accumulation of electric charge in the photodiodes 3 of the even-numbered rows and the discharge of this electric charge, has the reset line 34 and read-out line 35 connected thereto. The second shift register 35A outputs a reset pulse and a read-out pulse to the reset line 34 and read-out line 35, respectively, one row at a time in turn in the row direction, whereby needless charge that has accumulated in the photodiodes 3 of the even-numbered rows is swept out from the drains. By outputting the read-out pulse from the second shift register 35A to the read-out line 35 one column at a time in the column direction, the signal charge that has accumulated in the photodiodes 3 of the even-numbered rows is output from the signal lines 37 as a second video signal representing the even-numbered-row image.

The first and second video signals are applied to a selecting circuit 41. When a subject moving in the horizontal direction is imaged, the second video signal representing the even-numbered-row image is selected by the selecting circuit 41. When a subject moving in the vertical direction is imaged, the first video signal representing the odd-numbered-row image is selected by the selecting circuit 41.

Figure 7:
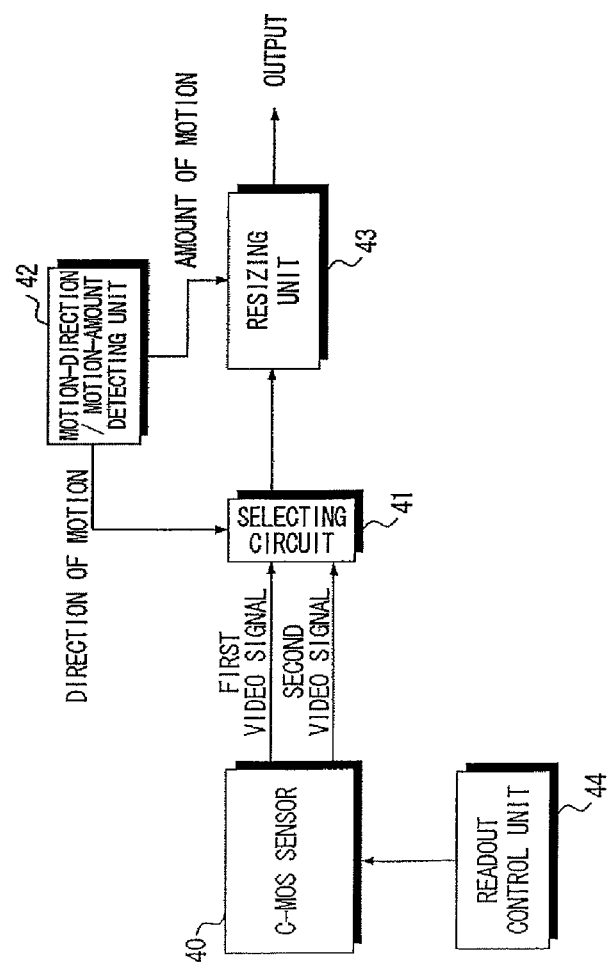
FIG. 7 is a block diagram illustrating the electrical configuration of an image sensing apparatus.

FIG. 7 is a block diagram illustrating the electrical configuration of the image sensing apparatus.

The C-MOS sensor 40 has its readout controlled by a read-out control unit 44. A read-out control pulse is applied to the C-MOS sensor 40 from the readout control unit 44, whereupon the control pulse is applied to the first shift register 25A and second shift register 35A, thereby causing the first video signal representing the odd-numbered-row image 4 and the second video signal representing the even-numbered-row image 5 to be input to the selecting circuit 41.

The image sensing apparatus includes a motion-direction/motion-amount detecting unit 42. The direction of motion and the amount of motion of the subject are detected by the motion-direction/motion-amount detecting unit 42. The motion-direction/motion-amount detecting unit 42, which includes an image sensor for sensing the image of the subject, uses this image sensor to perform imaging two times at a timing substantially simultaneous with the imaging timing of the C-MOS sensor 40. The direction of motion and amount of motion of the subject are detected from the two frames of the image subject obtained by thus imaging the subject twice. Data representing the detected direction of motion is input to the selecting circuit 41, and data representing the amount of motion is input to a resizing unit 43.

If the subject is traveling in the horizontal direction, the second video signal representing the even-numbered-row image is selected by the selecting circuit 41. If the subject is moving in the vertical direction, then the first video signal representing the odd-numbered-row image is selected by the selecting circuit 41. The video signal selected by the selecting circuit 41 is input to the resizing unit 43.

The resizing unit 43, based upon the applied data representing the amount of movement, applies a correction for lengthening or shortening, in the vertical or horizontal direction, the odd-numbered-row image or even-numbered-row image represented by the video signal input thereto. If the subject is moving in the horizontal direction, the amount of motion is a positive value when the subject is moving toward the right side and is a negative value when the subject is moving toward the left side. When the amount of motion is a positive value, the subject image moving toward the right side shortens. Accordingly, a correction is applied so as to lengthen the subject image in conformity with the amount of motion. Conversely, since the subject image moving toward the left side lengthens, a correction is applied so as to shorten the subject image in conformity with the amount of motion. If the subject is moving in the vertical direction, the amount of motion is a positive value when the subject is moving downward and is a negative value when the subject is moving upward. When the amount of motion is a positive value, the subject image moving toward the right side shortens. Accordingly, a correction is applied so as to lengthen the subject image in conformity with the amount of motion. Conversely, since the subject image moving upward lengthens, a correction is applied so as to shorten the subject image in conformity with the amount of motion.

The resizing unit 43 outputs the corrected video signal.

Figure 8:
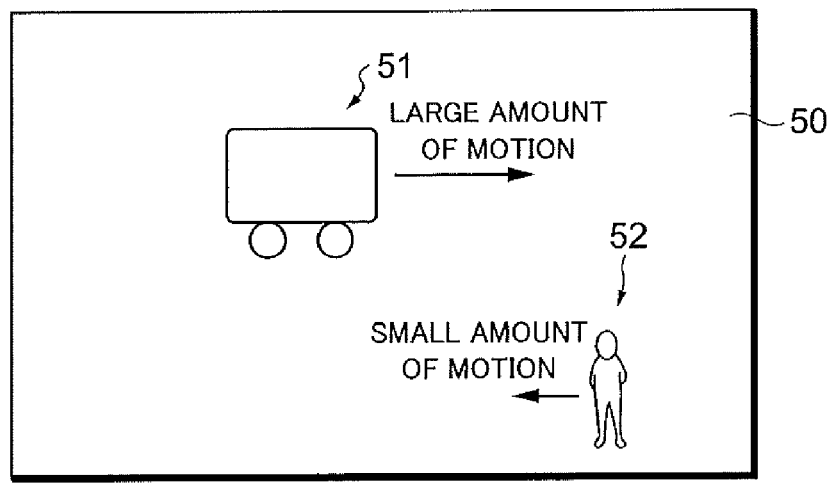
FIG. 8 is an example of subjects.

FIG. 8 is an example of a subject 50.

The subject 50 includes a subject 51 exhibiting large rightward motion and a subject 52 exhibiting small leftward motion. In a case where a plurality of moving subjects are included, as in this case where the subject 50 includes the moving subjects 51 and 52, resize processing is executed so as to correct the amount of motion of the subject exhibiting a large amount of motion. Further, the image signal corresponding to the direction of motion of the subject exhibiting the large amount of motion is selected by the selecting circuit 41.

Figure 9:
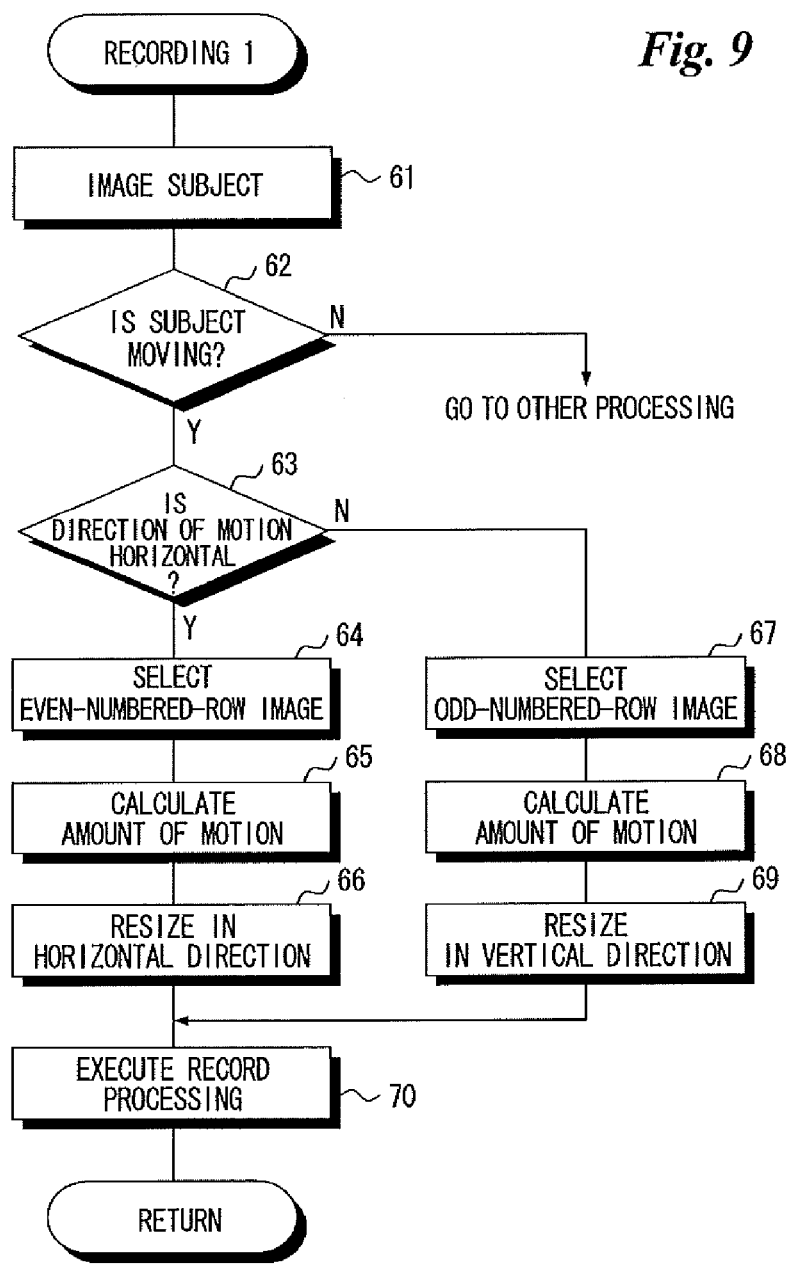
FIG. 9 is a flowchart illustrating processing executed by the image sensing apparatus.

FIG. 9 is a flowchart illustrating processing executing the image sensing apparatus.

A subject is imaged by the C-MOS sensor 40 (step 61). The direction of motion of the subject is detected by the motion-direction/motion-amount detecting unit 42 in the manner described above. If the subject exhibits motion ("YES" at step 62), then it is determined whether the direction of motion is horizontal (step 63).

If the direction of motion is horizontal ("YES" at step 63), the even-numbered-row image (second video signal) is selected by the selecting circuit 41 (step 64). The amount of motion of the subject is calculated by the motion-direction/motion-amount detecting unit 42 (step 65). The even-numbered-row image is resized in the horizontal direction in accordance with the calculated amount of motion (step 66).

If the direction of motion is vertical ("NO" at step 63), the odd-numbered-row image (first video signal) is selected by the selecting circuit 41 (step 64). The amount of motion of the subject is calculated by the motion-direction/motion-amount detecting unit 42 (step 68). The odd-numbered-row image is resized in the vertical direction in accordance with the calculated amount of motion (step 69).

A video signal (image data) representing the resized even-numbered-row image or odd-numbered-row image is recorded on a prescribed recording medium such as a memory card (step 70).

FIGS. 10 to 13 illustrate another embodiment of the present invention. This embodiment detects camera shake and corrects the image in accordance with the direction of camera shake and the amount of camera shake.

Figure 10:
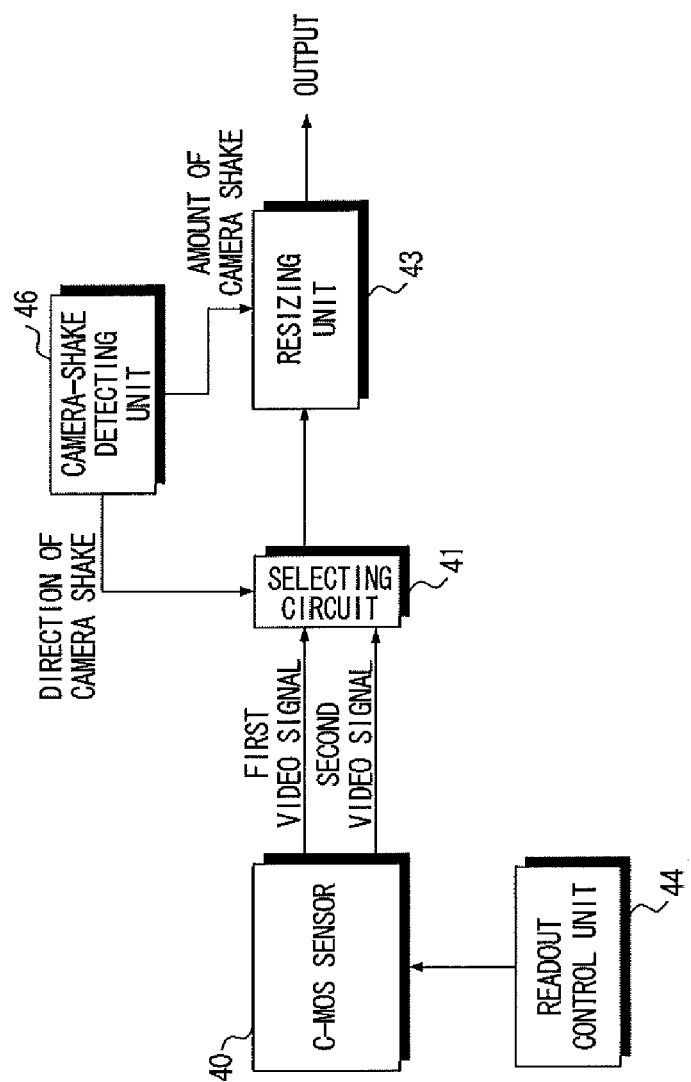
FIG. 10 is a block diagram illustrating the electrical configuration of an image sensing apparatus.

FIG. 10 is a block diagram illustrating the electrical configuration of the image sensing apparatus. Components in FIG. 10 identical with those shown in FIG. 7 are designated by like reference characters and need not be described again.

The image sensing apparatus is provided with a camera-shake detecting unit 46. The camera-shake detecting unit 46 detects the direction of camera shake and the amount of camera shake of the image sensing apparatus. Data representing the detected direction of camera shake is input to the selecting circuit 41 and data representing the amount of camera shake is input to the resizing unit 43.

In the same manner as that of the above-described subject exhibiting motion, the second video signal representing the even-numbered-row image is selected in case of camera shake in the horizontal direction, and the first video signal representing the odd-numbered-row image is selected in case of camera shake in the vertical direction. Further, a correction based upon resizing is executed in accordance with the amount of camera shake in the same manner as the correction based upon resizing in accordance with the amount of motion.

Figure 11:
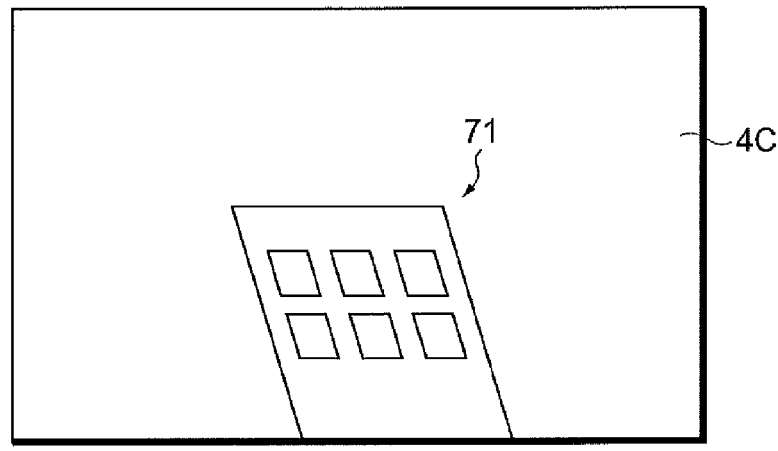
FIG. 11 is an example of an odd-numbered-row image.

FIG. 11 is an example of an odd-numbered-row image 4C.

The odd-numbered-row image 4C represents a subject in a case where camera shake in the horizontal direction has occurred. The odd-numbered-row image 4C includes a subject image 71 distorted by camera shake in the horizontal direction.

Figure 12:
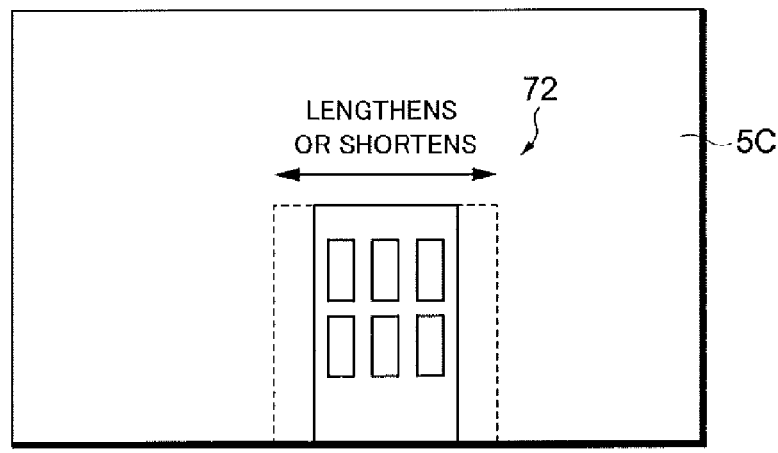
FIG. 12 is an example of an even-numbered-row image.

FIG. 12 is an example of an even-numbered-row image 5C.

The even-numbered-row image 5C also represents a subject in a case where camera shake in the horizontal direction has occurred. As mentioned above, since the even-numbered-row image 5C is obtained by reading out signal charge, which has accumulated in the photodiodes 3, one column at time in turn in the column direction, the read-out timing of the signal charge that has accumulated in the photodiodes 2 in the upper rows is the same as the read-out timing of the signal charge that has accumulated in the photodiodes 2 in the lower rows. As a result, even though the camera shake has occurred in the horizontal direction, the subject image 72 is free of diagonal distortion.

In a case where camera shake in the horizontal direction has occurred, however, the subject image 72 lengthens or shortens in accordance with the direction of camera shake. In this embodiment, the amount of lengthening or shortening is corrected in accordance with the direction and amount of camera shake.

Figure 13:
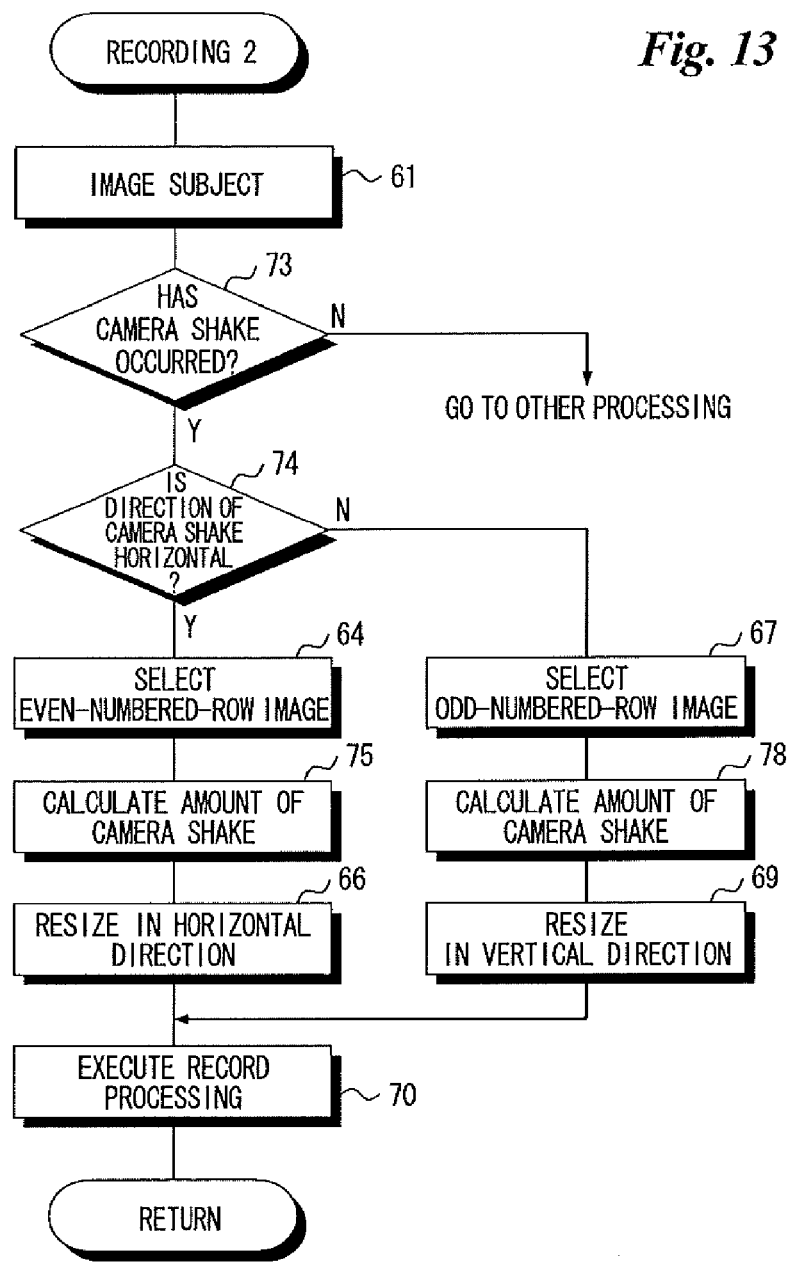
FIG. 13 is a flowchart illustrating processing executed by the image sensing apparatus.

FIG. 13 is a flowchart illustrating processing executed by the image sensing apparatus. Processing steps in FIG. 13 identical with those shown in FIG. 9 are designated by like step numbers and need not be described again.

As described above, the subject is imaged (step 61). If camera shake occurs ("YES" at step 73), whether the direction of camera shake is the horizontal direction is determined (step 74).

If the direction of camera shake is the horizontal direction, the even-numbered-row image is selected (step 64). The amount of camera shake is calculated (step 75) and resize processing conforming to the amount and direction of camera shake is executed (step 66). Resize processing is similar to the resize processing conforming to the amount and direction of motion of the subject as described above.

If the direction of camera shake is the vertical direction, then the odd-numbered-row image is selected (step 67). If the odd-numbered-row image has been selected, then the amount of camera shake is calculated and resize processing conforming to the amount of camera shake calculated and the direction of camera shake is executed (steps 78, 69).

As many apparently widely different embodiments of the present invention can be made without departing from the spirit and scope thereof, it is to be understood that the invention is not limited to the specific embodiments thereof except as defined in the appended claims.

What is claimed is:

1. A solid-state electronic image sensing apparatus comprising:
    a MOS sensor having optoelectronic transducers in each of which a color filter having a characteristic for transmitting a light component of the color red, green or blue or of the color cyan, magenta or yellow is formed on a photoreceptor surface, the optoelectronic transducers being arrayed in odd-numbered rows and odd-numbered columns and in even-numbered columns and even-numbered rows, or in odd-numbered rows and even-numbered columns and even-numbered rows and odd-numbered columns, wherein the characteristics of color filters that have been formed in two optoelectronic transducers in a diagonal direction in a [4n (where n is an integer equal to or greater than zero)+1]th row and (4n+2)th row are the same and the characteristics of color filters that have been formed in two optoelectronic transducers in a diagonal direction in a (4n+3)th row and (4n+4)th row are the same; and
    a read-out control device for controlling said MOS sensor so as to read out and output, as a first video signal, signal charge, which has accumulated in optoelectronic transducers of odd-numbered rows, one row at a time or one column at a time in turn, and read out and output, as a second video signal, signal charge, which has accumulated in optoelectronic transducers of even-numbered rows, one column at a time or one row at a time in turn so as to differ from read-out of the signal charge that has accumulated in the optoelectronic transducers of the odd-numbered rows.

2. The apparatus according to claim 1, wherein the MOS sensor is a C-MOS sensor.

3. The apparatus according to claim 1, further comprising:
    a motion-direction detecting device for detecting whether direction of motion of a subject imaged by said MOS sensor is the horizontal direction or the vertical direction; and
    a first selecting device for selecting, in response to detection of motion in the horizontal direction by said motion-direction detecting device, a video signal, which is either the first video signal or the second video signal, obtained based upon the signal charge that has been read out one column at a time in turn, and selecting, in response to detection of motion in the vertical direction by said motion-direction detecting device, a video signal, which is either the first video signal or the second video signal, obtained based upon the signal charge that has been read out one row at a time in turn.

4. The apparatus according to claim 1, further comprising:
    a motion-amount detecting device for detecting amount of motion in the direction of motion detected by said motion detecting device; and
    a first resizing device for resizing a subject image, which is represented by the video signal selected by said first selecting device, at a resizing ratio conforming to the amount of motion detected by said motion-amount detecting device and the direction of motion detected by said motion-direction detecting device.

5. The apparatus according to claim 1, further comprising:
a shake-direction detecting device for detecting whether direction of shake of said solid-state electronic image sensing apparatus is the horizontal direction or the vertical direction; and
a second selecting device for selecting, in response to detection of shake in the horizontal direction by said shake-direction detecting device, a video signal, which is either the first video signal or the second video signal, obtained based upon the signal charge that has been read out one column at a time in turn, and selecting, in response to detection of shake in the vertical direction by said shake-direction detecting device, a video signal, which is either the first video signal or the second video signal, obtained based upon the signal charge that has been read out one row at a time in turn.

6. The apparatus according to claim 1, further comprising:
a shake-amount detecting device for detecting amount of shake in the direction of shake detected by said shake-direction detecting device; and
a second resizing device for resizing a subject image, which is represented by the video signal selected by said second selecting device, at a resizing ratio conforming to the amount of shake detected by said shake-amount detecting device and the direction of shake detected by said shake-direction detecting device.

7. A method of controlling operation of a solid-state electronic image sensing apparatus in which, in a MOS sensor having optoelectronic transducers in each of which a color filter having a characteristic for transmitting a light component of the color red, green or blue or of the color cyan, magenta or yellow is formed on a photoreceptor surface, the optoelectronic transducers being arrayed in odd-numbered rows and odd-numbered columns and in even-numbered columns and even-numbered rows, or in odd-numbered rows and even-numbered columns and even-numbered rows and odd-numbered columns, the characteristics of color filters that have been formed in two optoelectronic transducers in a diagonal direction in a [4n (where n is an integer equal to or greater than zero)+1]th row and (4n+2)th row are the same and the characteristics of color filters that have been formed in two optoelectronic transducers in a diagonal direction in a (4n+3)th row and (4n+4)th row are the same;

said method comprising a step of controlling the MOS sensor so as to read out and output, as a first video signal, signal charge, which has accumulated in optoelectronic transducers of odd-numbered rows, one row at a time or one column at a time in turn, and read out and output, as a second video signal, signal charge, which has accumulated in optoelectronic transducers of even-numbered rows, one column at a time or one row at a time in turn so as to differ from read-out of the signal charge that has accumulated in the optoelectronic transducers of the odd-numbered rows.

\* \* \* \* \*